US00RE34449E

United States Patent [19]

Segill et al.

[11] E Patent Number: Re. 34,449

[45] Reissued Date of Patent: Nov. 23, 1993

[54] LIGHTING FIXTURE

[75] Inventors: William Segill, Newton; Mark E. Segill, Framingham; Michael Dangelo, Seekonk, all of Mass.

[73] Assignee: American Lighting Fixture Corp., Taunton, Mass.

[21] Appl. No.: 846,545

[22] Filed: Mar. 5, 1992

Related U.S. Patent Documents

Reissue of:

[64] Patent No.: D. 307,643
Issued: May 1, 1990
Appl. No.: 196,961
Filed: May 20, 1988

[52] U.S. Cl. ..... D26/91; D26/85

[58] Field of Search ..... D26/72, 80–92; 362/806, 362, 404–408, 147, 351, 360

[56] References Cited

U.S. PATENT DOCUMENTS

| | | | |
|---|---|---|---|
| D. 80,493 | 2/1930 | Rosenblatt | D26/91 |
| D. 80,913 | 4/1930 | Rosenblatt | D26/91 |
| D. 83,633 | 3/1931 | McFadden | D26/81 |
| 1,791,886 | 2/1931 | Colucci | 362/360 |

OTHER PUBLICATIONS

Home Lighting & Accessories, Dec. 1985, p. 77, Lighting Fixture #L12813.

Wilshire Lighting Catalog, 1983, p. 10, Chandelier #W228/14.

Wilshire Lighting Catalog, 1984, p. 6, Lighting Fixture #W944/6.

Wilshire Lighting Catalog, 1984, p. 14 Chandelier #W727/9.

*Primary Examiner*—Susan J. Lucas

*Attorney, Agent, or Firm*—Wolf, Greenfield & Sacks

EXEMPLARY CLAIM

CLAIM

The ornamental design for a lighting fixture, as shown and described.

DESCRIPTION

Figure 1:
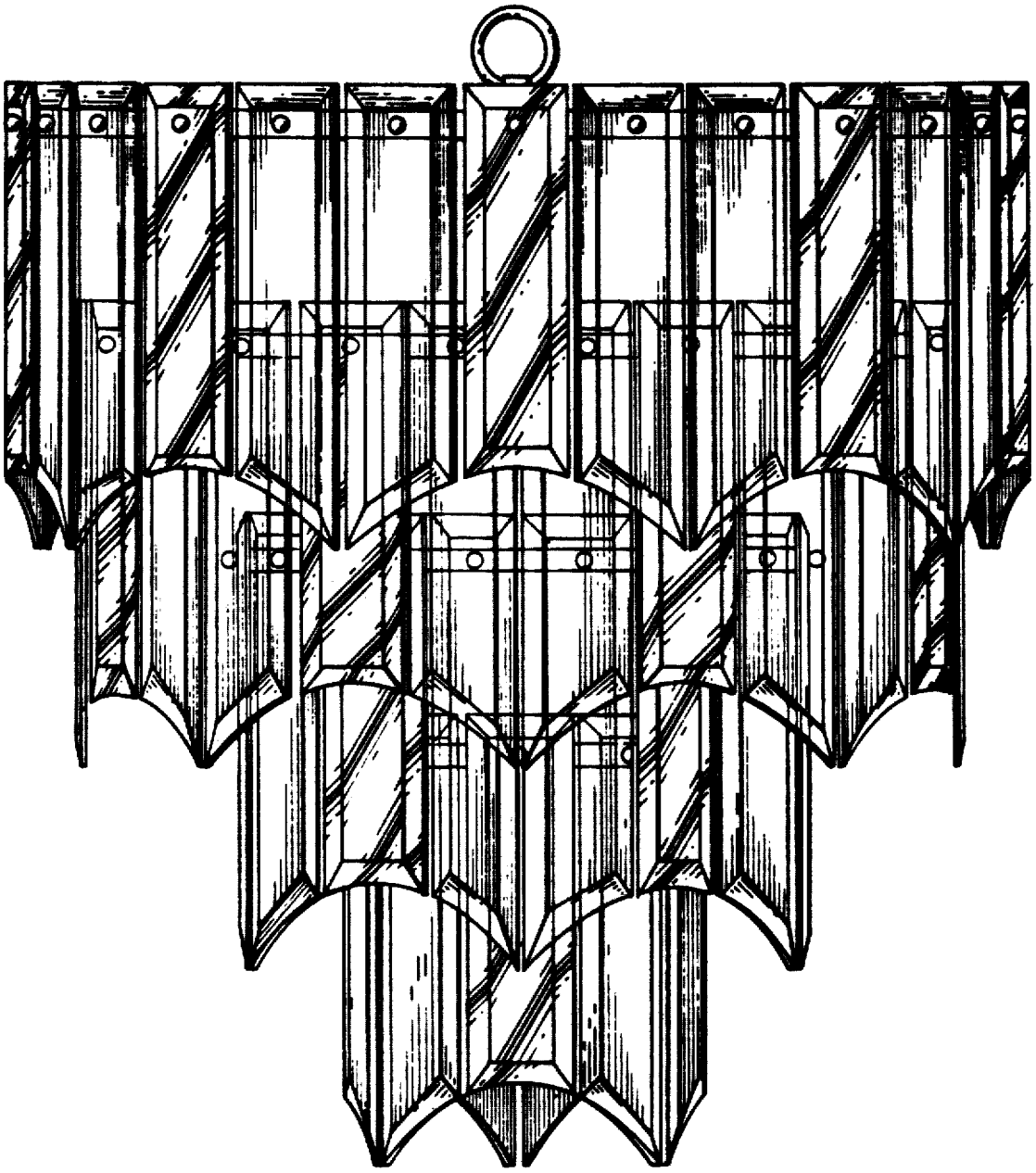
FIG. 1 is a side elevational view of a lighting fixture showing our new design, all sides being identical.
Figure 2:
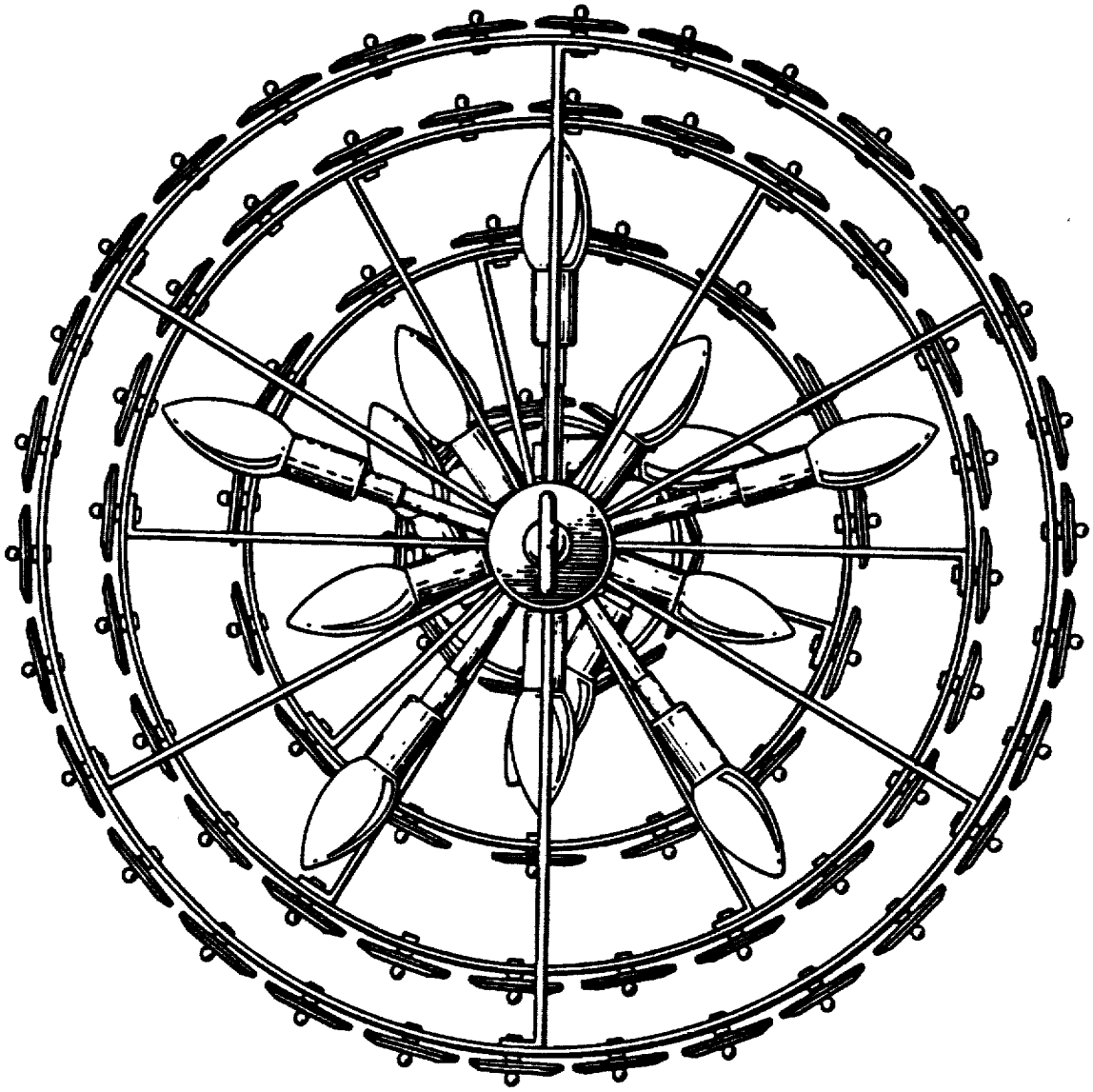
FIG. 2 is a top plan view thereof [, on an enlarged scale]
Figure 3:
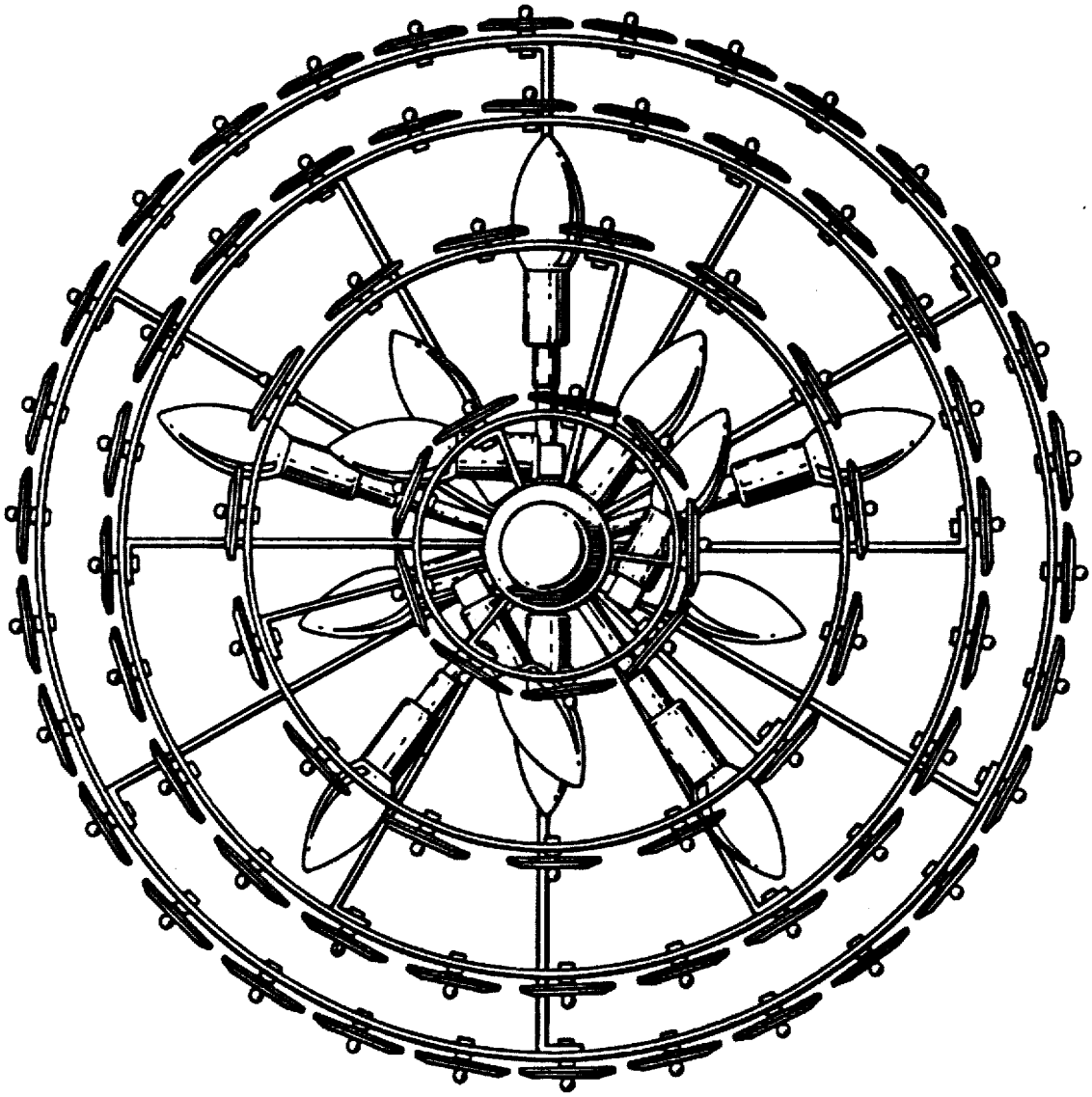
FIG. 3 is a bottom plan view thereof [on an enlarged scale]
Figure 4:
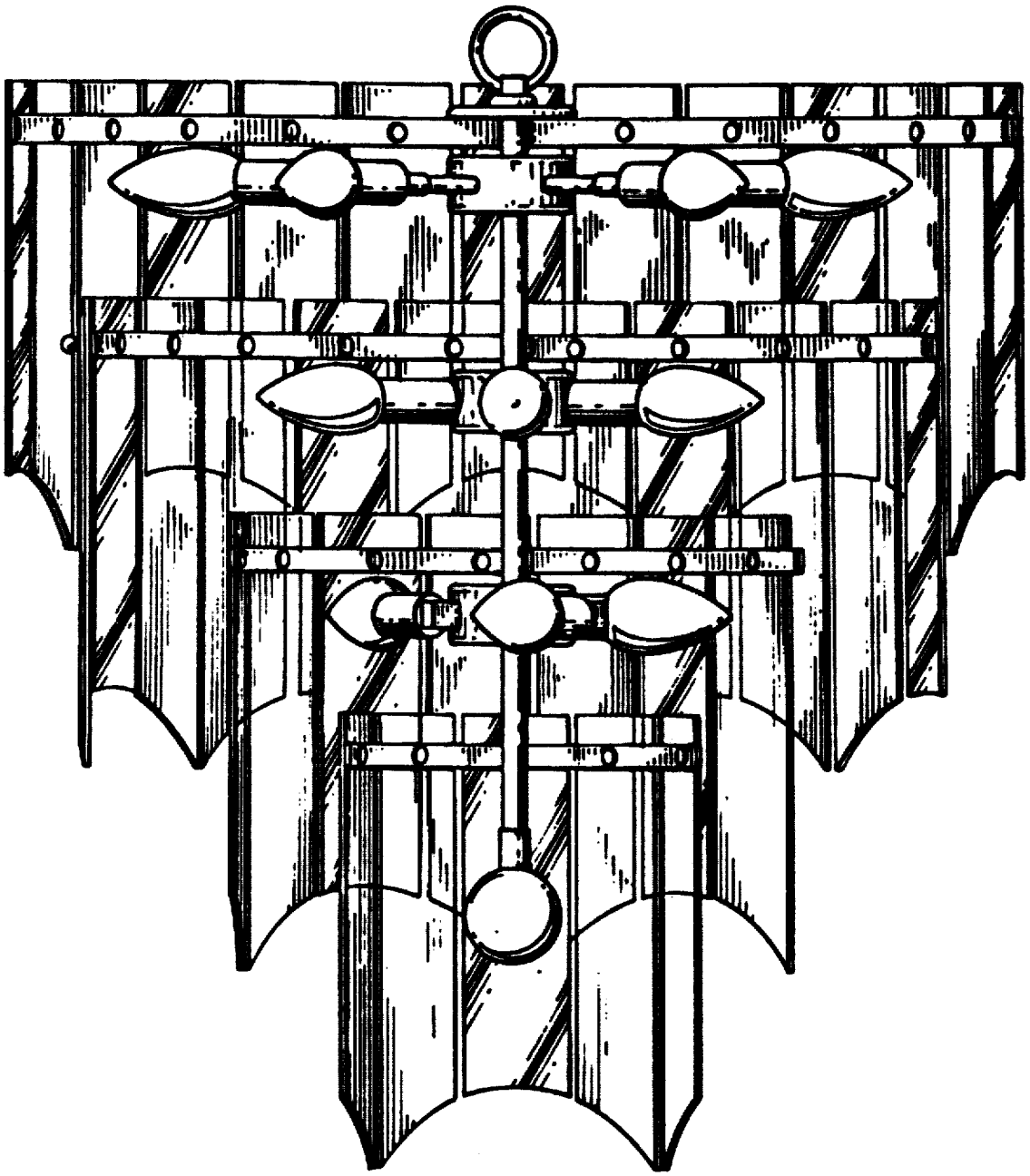
FIG. 4 is a fragmentary side elevational view thereof [on an enlarged scale], the side being cut away to show the interior lights.

The rectangular panels of the fixture are shaded with oblique lines to indicate [translucency] *that they are mirrored*. The remaining panels are transparent.

1 Claim, 4 Drawing Sheets